Patented Apr. 30, 1929.

1,711,105

UNITED STATES PATENT OFFICE.

JOHN T. TRAVERS, OF COLUMBUS, OHIO.

PROCESS FOR TREATING CANNERY WASTE.

No Drawing.   Application filed November 15, 1927.   Serial No. 233,518.

This invention relates to a process for the purification of highly putrescible waste liquors which are emitted from canning factories so that the same may be discharged into running streams or other bodies of water without causing objectionable pollution thereof.

It is the object of the invention to remove from such waste liquors the objectionable putrescible matter and produce an effluent of suitable character which can be discharged into a stream, supplying only a small dilution, without causing pollution of such stream.

The process is not concerned with the bacterial consumption of the putrescible matter of the waste but deals primarily with the separation of the putrescible matter from the waste.

For the purpose of clearness, the general characteristics of waste liquors from canning factories, hereinafter termed "cannery waste", will be considered.

It is difficult to give a definition of cannery waste liquors since they vary markedly with the fruit or vegetable being canned. The general characteristics of cannery waste, however, remain much the same in the treatment of the various materials. The waste may generally be said to contain more or less varying amounts of nitrogenous matter in the form of proteins, carbohydrates, organic wastes, starch, the principal carbohydrate of vegetables, glucose, and a lesser amount of organic substances. The principal polluting substances of the waste are proteins and starch, both of which are subject to rapid decomposition.

Cannery waste constitutes a serious menace to any stream into which it flows. The oxygen demand of the waste is exceedingly high. It is very fermentable, substantial fermentation being noticeable in a period of six hours. The appearance of the waste during fermentation is extremely bad due to the formation of curds and strings which float in the solution.

Since the principal putrescible constituents of the waste are proteins and carbohydrates, the removal of these bodies from the waste produces a very material purification thereof. The proteins are complex combinations of amino acids, the most important constituent of which is nitrogen. They are unstable bodies and are colloidal in nature. I have ascertained that these proteins which are in colloidal form carry a positive charge in an acid solution and a negative charge in an alkaline solution. The protein content of the waste constitutes about 10% of the total solid matter content. It is, however, one of the most active constitutents of the waste and a non-putrescible effluent cannot be produced without its removal. Part of the organic matter content of the cannery waste is composed of carbohydrates, the chief one of which is starch. The starch grains are also colloids in cannery waste. Only about 5% of the total solid matter content of this waste will settle from the waste on standing. The glucose present in the waste is in true solution and there is also some organic matter in true solution.

The starch content above referred to constitutes about one-third of the total solid matter of the waste. The colloidal starch grains, like the colloidal proteins, carry a positive charge when the solution has an acid reaction and are negatively charged when the solution has an alkaline reaction.

From the foregoing it is evident that the principal polluting constituents of cannery waste are present in this waste in colloidal form. My process is, therefore, primarily concerned with the removal of the colloids from the waste, which represent in excess of 50% of the solids therein.

I have ascertained that the colloids present in cannery waste can be removed from the waste when the same has an alkaline reaction by the incorporation of a suitable electrolyte in the form of an ionizable metallic salt which dissociates, releasing positive ions which are adsorbed by the negatively charged colloids, destroying their stability and transforming them into suspensoids. Thus the material which is originally present in the waste in colloidal form in dispersion in the liquid, becomes material in suspension and can be readily coagulated by the incorporation of a suitable coagulating agent in the liquid.

In the practice of my process, I incorporate in the cannery waste a suitable quantity of a treating mixture containing constituents capable of (a) effecting an alkaline reaction, (b) supplying an electrolyte producing material, and (c) effecting a coagulation of suspended matter.

Hydrated lime is normally employed as the constituent of my mixture which is capable of effecting an alkaline reaction in the solution, thus insuring that all colloids present in the waste will carry negative signs.

Various ionizable substances may be employed as the electrolyte producing material in my mixture. I prefer to use a reagent containing an ionizable salt of calcium as, for example, $CaSO_4$. Magnesium sulphate can, however, be used. The waste dust collected from the precipitators employed in the manufacture of cement also constitutes an excellent electrolyte producing material as does also the solid waste products recovered from the waste liquors discharged from an alkali plant in the manufacture of chlorine, chloride of lime and caustic soda. These materials have a substantial content of calcium carbonate and calcium sulphate.

There are several coagulating agents or combinations of coagulating agents which produce excellent results when incorporated in my treating mixture. I find aluminum sulphate used alone, ferrous sulphate used alone, or either of these substances used in combination with mono-basic calcium phosphate to give satisfactory results.

As exemplary of the proportions of the various ingredients which should be employed in my treating mixture, it should be noted that the electrolyte producing material should always constitute the predominating constituent of the treating mixture. The quantity of lime may be varied depending upon the acidity of the waste. A mixture composed as indicated in the following table will be found satisfactory:

| | Parts. |
|---|---|
| Waste dust from cement manufacture or waste from alkali plant | 40.8 |
| Calcium sulphate | 17.1 |
| Hydrated lime | 30.0 |
| Ferrous sulphate | 12.1 |

When a combination of ferrous sulphate and mono-basic calcium phosphate are employed as the coagulating agent, the quantity of ferrous sulphate will, of course, be cut down.

It will be appreciated that the proportions of the various ingredients in the treating mixture may be varied within relatively wide limits so long as the constituents which supply the electrolyte producing material predominate in the mixture.

The quantity of the mixture necessary to treat any particular type of cannery waste can be readily ascertained by one versed in the art of liquid purification by making a few trial tests and noting the rapidity of precipitation, the size of the floc, and the clarification of the liquid. Inasmuch as cannery waste is a highly concentrated waste, it will be appreciated that a relatively large quantity of a treating mixture is necessary to insure complete clarification and purification of this waste. I find that from 70 to 80 pounds of my treating mixture per 1,000 gallons of waste will normally be found adequate to effect substantially complete purification of the waste. However, these are not the operative limits. In some instances 50 pounds of mixture may give satisfactory results while in other instances in excess of 100 pounds may give the desired results.

The process is carried out by introducing the proper quantity of treating mixture to the waste, thoroughly incorporating the same therein by suitably agitating the liquid, thereafter maintaining the liquid in a quiescent state to permit the precipitated solids to settle out. The clarified effluent may be drawn off and if desirable, passed through a runway loaded with travertine to effect a substantial reaeration of the effluent.

During the treating of cannery waste with my treating mixture there occurs a formation of a positively charged ferrous hydroxide by the action of the alkaline solution formed as a result of the reaction of the lime on the water of the waste with the ferrous sulphate as follows:—

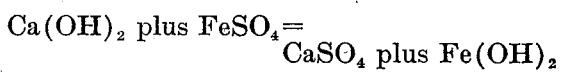

As will be noted from the last reaction, calcium sulphate is formed. The positive calcium ions are supplied to the solution by the dissociation of the calcium sulphate, thus a ferrous hydroxide, an excess of positive calcium ions, and a slightly alkaline solution, are formed. Since the colloids in the solution are negatively charged, they are precipitated by the adsorption of the positively charged calcium ions.

The proteins and starch present in the cannery waste are thus largely removed. At the instant of coagulation, the entire solution is permeated by the flocculent ferrous hydroxide formed. The particles of suspended matter are enveloped and carried down with the hydroxide. The excess of electrolyte producing material being of a high specific gravity, increases the rate of settling of the precipitated solids. Since the electrolyte producing material is relatively slowly soluble, it will supply the positive ions to the solution only as needed. The organic acids in the waste are neutralized by the calcium hydroxide and the excess of electrolyte producing material, leaving the effluent slightly alkaline.

As heretofore pointed out, the glucose and some of the organic matter in the waste are in true solution. The process does not remove these constituents and consequently the effluent will show a small oxygen demand. The effluent may be temporarily reaerated by passing the same over a mass of travertine. The oxygen taken up during such aeration is later used up by the effluent, yet it materially assists in the final oxidation and stabilization thereof.

As illustrating the effectiveness and operation of the process, the following exemplary treatments are given. A cannery waste was treated which showed upon analysis:—

| | P. P. M. |
|---|---|
| Total solids | 3610 |
| Total organic matter | 3080 |
| Total mineral matter | 530 |
| Suspended matter | 780 |
| Suspended organic matter | 752 |
| Suspended mineral matter | 28 |
| Phosphates as $P_2O_5$ | 36 |
| Proteins | 372 |
| Carbohydrates | 1250 |
| Glucose | 320 |
| 24 hour biochemical oxygen demand | 780 |
| 48 hour biochemical oxygen demand | 1120 |
| 10 day biochemical oxygen demand | 2040 |

The waste is a very concentrated one and requires an exceedingly high dilution in order for a stream to carry the waste, the dilution necessitated being substantially 360 to 1.

The colloidal composition of the waste is ascertained by dialyzing the waste. With respect to the colloidal composition of the waste it is found that 54.8% of the total solids in the waste are true colloids, that 94.9% of the twenty-four hour biochemical oxygen demand and 88.4% of the ten day biochemical oxygen demand of the waste is due to the colloidal content of the waste.

The colloidal fraction of the waste showed upon analysis:

| | P. P. M. |
|---|---|
| Total solids | 1980 |
| Total organic matter | 1964 |
| Carbohydrates | 1208 |
| Proteins | 364 |
| 24 hour biochemical oxygen demand | 740 |
| 48 hour biochemical oxygen demand | 1060 |
| 10 day biochemical oxygen demand | 1782 |

The waste when treated in accordance with my process employing substantially 77 pounds of treating mixture for each 1,000 gallons of waste, yielded an effluent which showed upon analysis:

| | P. P. M. |
|---|---|
| Total solids | 1080 |
| Total organic matter | 520 |
| Total mineral matter | 560 |
| Suspended matter | 8 |
| Suspended organic matter | 6 |
| Suspended mineral matter | 2 |
| Phosphates as $P_2O_5$ | 0 |
| Proteins | 8 |
| Carbohydrates | 12 |
| Glucose | 318 |
| 24 hour biochemical oxygen demand | 12 |
| 48 hour biochemical oxygen demand | 22 |
| 10 day biochemical oxygen demand | 196 |

The colloidal fraction of the effluent showed upon analysis:—

| | P. P. M. |
|---|---|
| Total solids | 12 |
| Total organic matter | 10 |
| Carbohydrates | 9 |
| Proteins | 0 |
| 24 hour biochemical oxygen demand | 2 |
| 48 hour biochemical oxygen demand | 5 |
| 10 day biochemical oxygen demand | 12 |

It is significant to note that 38.2% of the total biochemical oxygen demand of the raw waste is a 24 hour demand and that 55% of the total biochemical oxygen demand is a 48 hour demand whereas only 6% of the total oxygen demand of the effluent is a 24 hour demand and only 11.2% of the total oxygen demand is a 48 hour demand.

From the above analysis it will be evident that the process employing the treating mixture given shows an average efficiency of around 90% in the purification of this concentrated cannery waste. In the illustrative treatment given, the treating mixture contained no mono-basic calcium phosphate but was composed of waste dust from the manufacture of cement, calcium sulphate, lime, and ferrous sulphate in the proportions hereinbefore set forth.

In some instances, a superior coagulation may be obtained by incorporating monobasic calcium phosphate in the treating mixture.

The sludge obtained from the treatment of cannery waste in accordance with the process herein described constitutes a very good fertilizer having a ready market and renders the operation of the process extremely economical.

The description herein given is merely illustrative of my novel process and my invention in its broader aspects comprehends within its scope such changes and modifications as may be necessary to adapt the same to the local conditions where it may be advantageous to employ the process.

Having thus described my invention, what I claim is:—

1. A process for treating cannery waste comprising effecting an alkaline reaction in the waste and incorporating therein a soluble salt of calcium and a coagulating agent, said coagulating agent including a primary phosphate of calcium.

2. A process for purifying waste liquors emitted from canning factories comprising effecting an alkaline reaction in the waste liquors, incorporating therein an ionizable substance characterized by its ability to dissociate in the liquor and release positive ions which are adsorbed by colloids present in the alkaline liquor, forming suspensoids, coagulating the suspensoids so formed by the introduction to the liquors of a quantity of ferrous sulphate and a quantity of monobasic calcium phosphate.

3. A process for purifying the polluted liquors discharged from canning factories comprising reacting on said polluted liquors with a reagent containing lime, an ionizable salt of calcium, and a quantity of monobasic calcium phosphate.

JOHN T. TRAVERS.